(12) United States Patent
Cloft et al.

(10) Patent No.: US 8,869,507 B2
(45) Date of Patent: Oct. 28, 2014

(54) TRANSLATABLE CASCADE THRUST REVERSER

(75) Inventors: Thomas G. Cloft, Glastonbury, CT (US); Robert L. Gukeisen, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1034 days.

(21) Appl. No.: 12/686,620

(22) Filed: Jan. 13, 2010

(65) Prior Publication Data
US 2011/0167790 A1 Jul. 14, 2011

(51) Int. Cl.
*F02K 3/02* (2006.01)
*F02K 3/06* (2006.01)
*F02K 1/68* (2006.01)

(52) U.S. Cl.
CPC .... *F02K 3/06* (2013.01); *F02K 1/68* (2013.01)
USPC ...... 60/226.3; 60/226.2; 60/230; 239/265.29; 239/265.27; 244/110 B; 244/53 R; 244/54

(58) Field of Classification Search
USPC ................ 60/226.2, 226.3, 230; 239/265.29; 244/110 B, 53 R, 54
See application file for complete search history.

(56) References Cited

U.S. PATENT DOCUMENTS

| | | | |
|---|---|---|---|
| 3,997,132 A * | 12/1976 | Erwin | 244/199.3 |
| 4,030,290 A | 6/1977 | Stachowiak | |
| 4,073,440 A * | 2/1978 | Hapke | 239/265.29 |
| 4,147,027 A | 4/1979 | Greathouse | |
| 4,177,639 A | 12/1979 | Taylor | |
| 4,185,798 A * | 1/1980 | Dickenson | 244/110 B |
| 4,216,926 A | 8/1980 | Lawson | |
| 4,278,220 A | 7/1981 | Johnston et al. | |
| 4,373,328 A | 2/1983 | Jones | |
| 4,502,637 A | 3/1985 | Nightingale | |
| 4,519,561 A | 5/1985 | Timms | |
| 4,527,391 A | 7/1985 | Marx et al. | |
| 4,585,189 A * | 4/1986 | Buxton | 244/54 |
| 4,823,547 A | 4/1989 | Newton | |
| 4,922,712 A | 5/1990 | Matta et al. | |
| 4,922,713 A * | 5/1990 | Barbarin et al. | 60/226.2 |
| 4,998,409 A | 3/1991 | Mutch | |
| 5,046,307 A | 9/1991 | Matta et al. | |
| 5,120,004 A | 6/1992 | Matthias | |
| 5,197,693 A | 3/1993 | Remlaoui | |
| 5,209,057 A | 5/1993 | Remlaoui | |
| 5,228,641 A | 7/1993 | Remlaoui | |
| 5,230,213 A | 7/1993 | Lawson | |
| 5,239,822 A | 8/1993 | Buchacher | |
| 5,243,817 A | 9/1993 | Matthias | |
| 5,309,711 A | 5/1994 | Matthias | |
| 5,315,821 A | 5/1994 | Dunbar et al. | |
| 5,575,147 A | 11/1996 | Nikkanen | |
| 5,655,360 A | 8/1997 | Butler | |
| 5,713,537 A | 2/1998 | Tindell | |

(Continued)

*Primary Examiner* — Craig Kim
(74) *Attorney, Agent, or Firm* — Carlson, Gaskey & Olds, P.C.

(57) ABSTRACT

A nacelle assembly for a high-bypass gas turbine engine includes a fan nacelle that includes a first fan nacelle section and a second fan nacelle section, the second fan nacelle section movable relative to the first fan nacelle section. A cascade array is mounted to the first fan nacelle section for movement relative thereto between a stored position and a deployed position, the stored position locates the cascade array at least partially within the first fan nacelle section.

19 Claims, 10 Drawing Sheets

(56) References Cited

U.S. PATENT DOCUMENTS

| | | | |
|---|---|---|---|
| 5,794,434 A | 8/1998 | Szupkay | |
| 5,806,302 A | 9/1998 | Cariola et al. | |
| 5,904,320 A | 5/1999 | Tindell | |
| 5,927,647 A | 7/1999 | Masters et al. | |
| 6,148,607 A | 11/2000 | Baudu et al. | |
| 6,151,883 A | 11/2000 | Hatrick et al. | |
| 6,311,928 B1 | 11/2001 | Presz, Jr. et al. | |
| 6,434,927 B1 | 8/2002 | Stretton | |
| 6,474,059 B2 | 11/2002 | Stretton | |
| 6,546,715 B1 | 4/2003 | Blevins et al. | |
| 6,557,338 B2 | 5/2003 | Holme et al. | |
| 6,568,172 B2 | 5/2003 | Jannetta et al. | |
| 6,584,763 B2 | 7/2003 | Lymons et al. | |
| 6,684,623 B2 | 2/2004 | Langston et al. | |
| 6,824,101 B2 | 11/2004 | Sternberger et al. | |
| 6,845,946 B2 | 1/2005 | Lair | |
| 6,895,742 B2 | 5/2005 | Lair et al. | |
| 6,915,984 B2 | 7/2005 | Sternberger et al. | |
| 6,968,675 B2 | 11/2005 | Ramlaoui et al. | |
| 6,976,352 B2 | 12/2005 | Lair | |
| 7,124,981 B2 | 10/2006 | Parham | |
| 7,146,796 B2 | 12/2006 | Lair | |
| 7,264,203 B2 | 9/2007 | Lair | |
| 2008/0250770 A1* | 10/2008 | Emprin et al. | 60/226.2 |
| 2011/0296813 A1* | 12/2011 | Frank et al. | 60/230 |

* cited by examiner

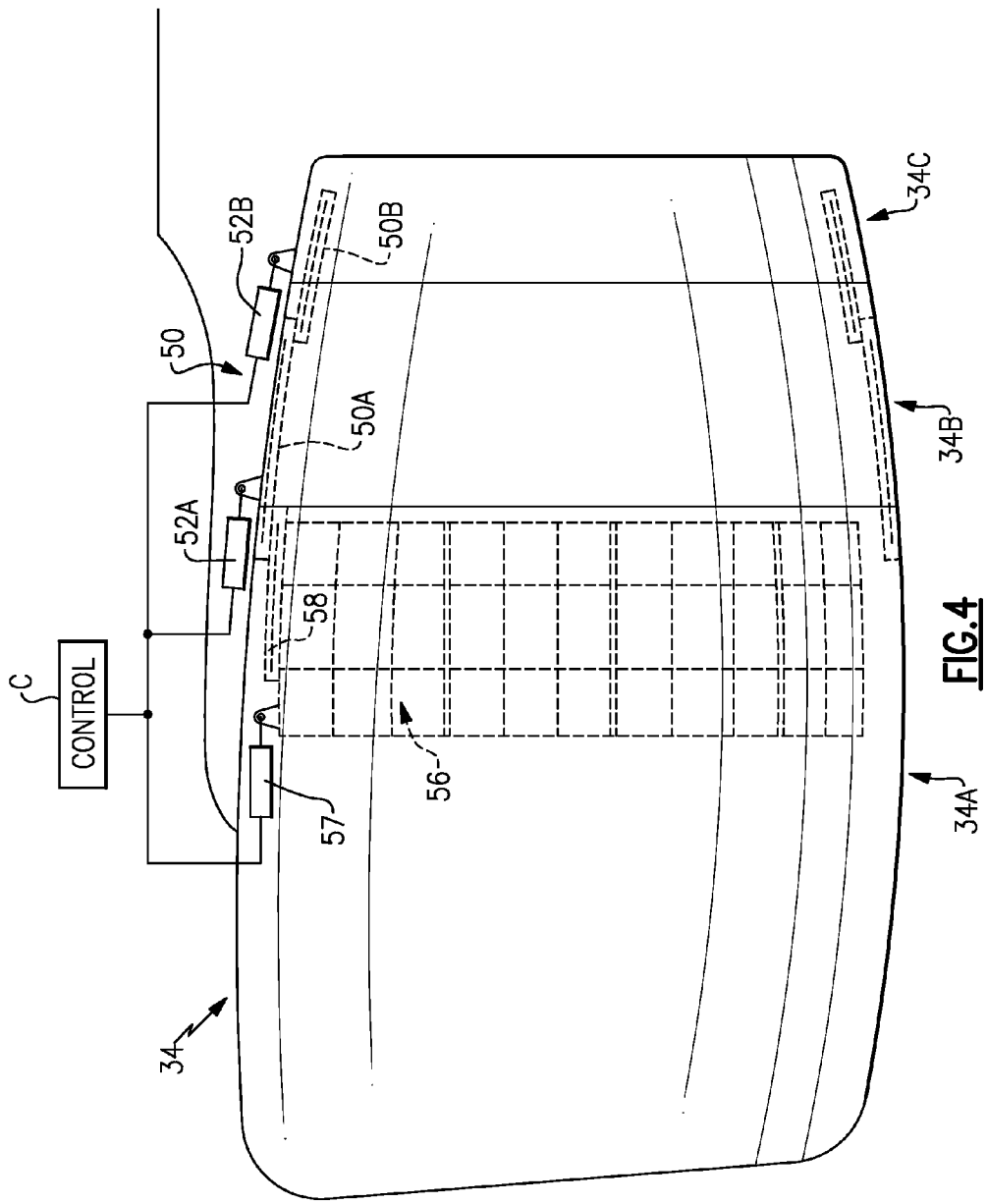

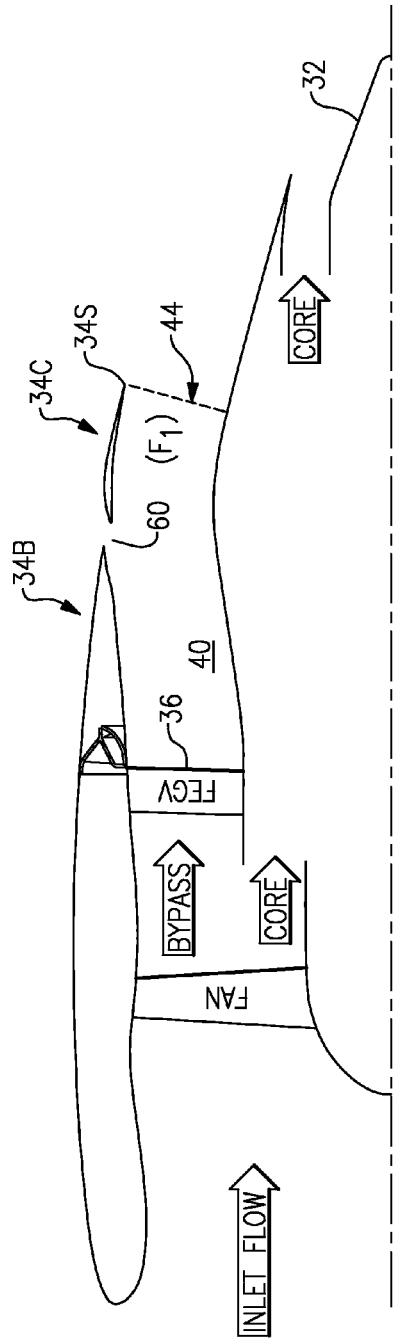
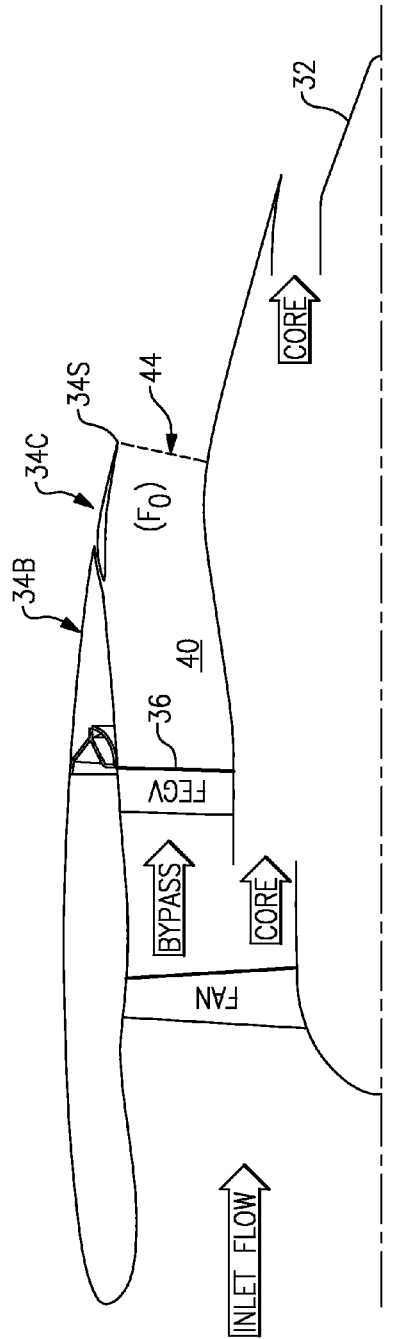
FIG.5B
FIG.5A

US 8,869,507 B2

TRANSLATABLE CASCADE THRUST REVERSER

BACKGROUND

The present disclosure relates to a gas turbine engine, and more particularly to a turbofan engine having a thrust reverser.

Gas turbine engines may include a thrust reverser in which a translatable sleeve forms a rearward, outer wall portion of a bypass duct. For normal air flow through the bypass duct, the translatable sleeve resides in a closed position. For thrust reverse air flow, the translatable sleeve is translated rearwardly to form an outlet defined by a fixed cascade array which forms a series of fixed, curved deflector blades.

A number of blocking doors are pivotally mounted on the translatable sleeve and coupled by linkages to the core cowl of the engine. When the translatable sleeve moves rearwardly upon deployment, the linkages pivot the blocking doors radially inwardly to block the bypass duct and redirect the air flow from the bypass duct through the cascade array in an outwardly and forwardly direction.

SUMMARY

A nacelle assembly for a high-bypass gas turbine engine according to an exemplary aspect of the present disclosure includes a core nacelle defined about an engine centerline axis. A fan nacelle is mounted at least partially around the core nacelle to define a fan bypass flow path, the fan nacelle includes a first fan nacelle section and a second fan nacelle section, the second fan nacelle section movable relative to the first fan nacelle section. A cascade array is mounted to the first fan nacelle section for movement relative thereto between a stored position and a deployed position, the stored position locates the cascade array at least partially within the first fan nacelle section.

A method of thrust reversal for a high-bypass gas turbine engine according to an exemplary aspect of the present disclosure include selectively locking a cascade array to a second fan nacelle section and translating the cascade array and the second fan nacelle section as an assembly between a stored position and a deployed position, the stored position locates the cascade array at least partially within a first fan nacelle section forward of the second fan nacelle section.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a schematic view of the engine nacelle assembly, actuator and slider arrangement therefore;

FIG. 5A is a perspective view of the engine with the VAFN in a closed position;

FIG. 5B is a sectional side view of the VAFN in an open position;

DETAILED DESCRIPTION

Figure 1:
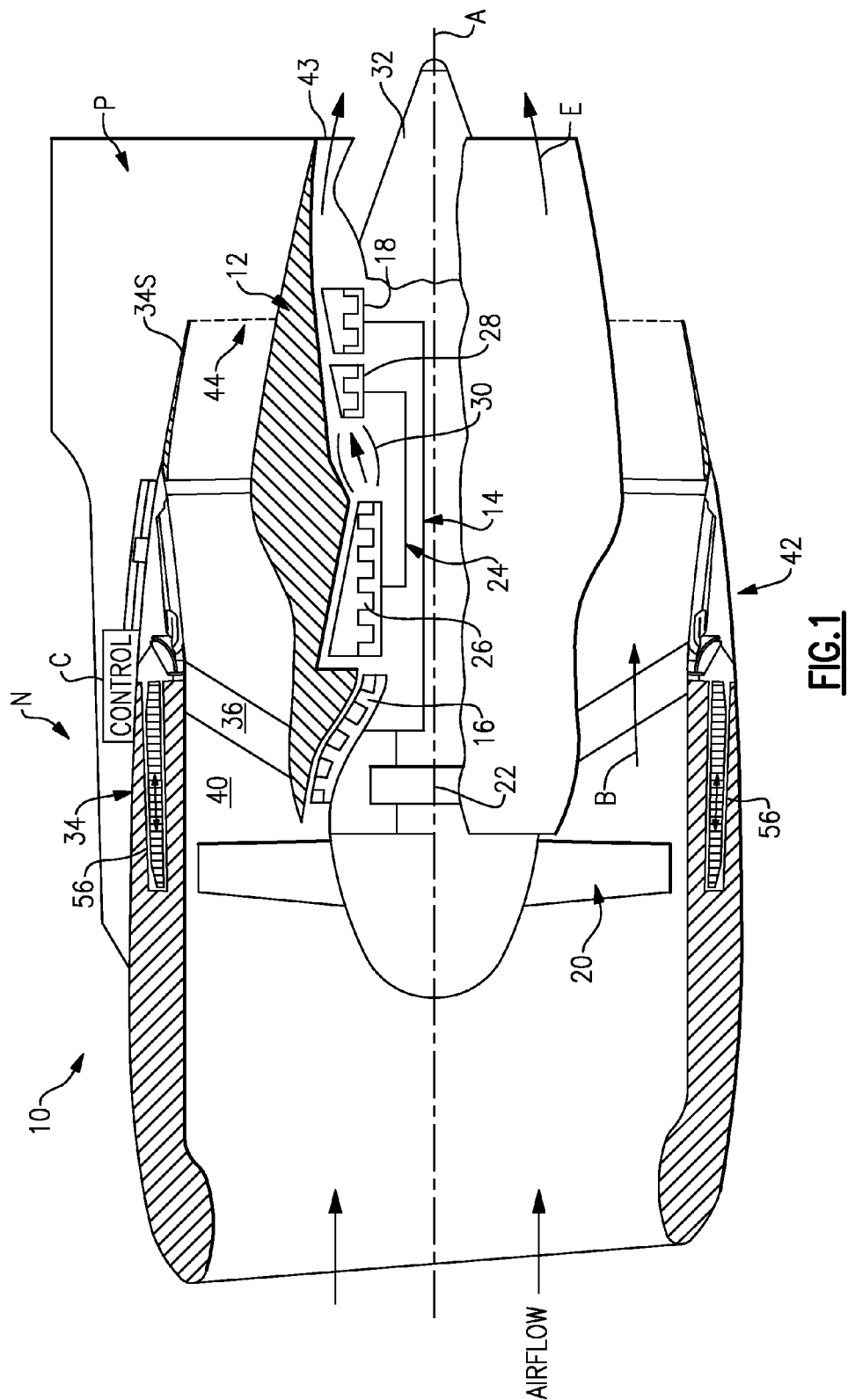
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N. The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine with a bypass ratio greater than ten (10:1), a turbofan diameter significantly larger than that of the low pressure compressor 16, and the low pressure turbine 18 with a pressure ratio greater than 5:1. The gear train 22 may be an epicycle gear train such as a planetary gear system or other gear system with a gear reduction ratio of greater than 2.5:1. It should be understood, however, that the above parameters are only exemplary of one non-limiting embodiment of a geared architecture engine and that this disclosure is applicable to other gas turbine engines including direct drive turbofans.

Airflow enters a fan nacelle assembly 34 which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with respective spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle assembly 34 by circumferentially spaced structures 36 often referred to as Fan Exit Guide Vanes (FEGVs). A bypass flow path 40 is defined between the core nacelle 12 and the fan nacelle assembly 34. The engine 10 generates a high bypass flow arrangement with a bypass ratio in which approximately eighty percent of the airflow which enters the fan nacelle assembly 34 becomes bypass flow B. The bypass flow B communicates through the generally annular bypass flow path 40 and is discharged from the engine 10 through a variable area fan nozzle (VAFN) 42 which defines a nozzle exit area 44 between the fan nacelle assembly 34 and the core nacelle 12 at a fan nacelle end segment 34S of the fan nacelle assembly 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the mass flow of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN 42 allows the engine to change to a more favorable fan operating line at low power, avoiding the instability region and still provide the relatively smaller nozzle area necessary to obtain a high-efficiency fan operating line at cruise speeds.

A significant amount of thrust is provided by the bypass flow B due to the high bypass ratio. The fan section 20 of the engine 10 is designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 2:
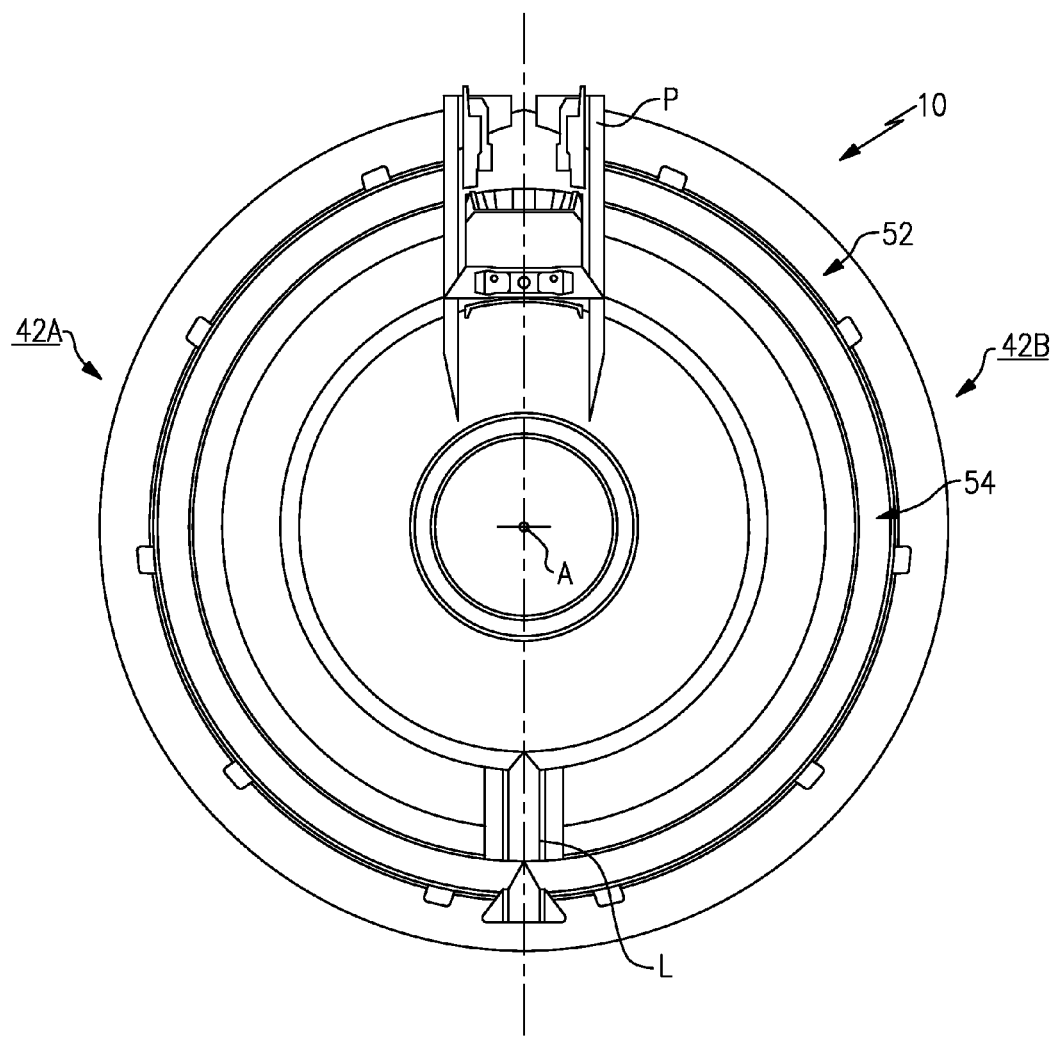
FIG. 2 is a rear view of the engine.

The VAFN 42 may be separated into at least two sectors 42A-42B (FIG. 2) defined between the pylon P and a lower Bi-Fi splitter L which typically interconnects a larger diameter fan duct reverser cowl and a smaller diameter core cowl. It should be understood that although two segments are illustrated, any number of sectors may alternatively or additionally be provided.

Figure 3A:
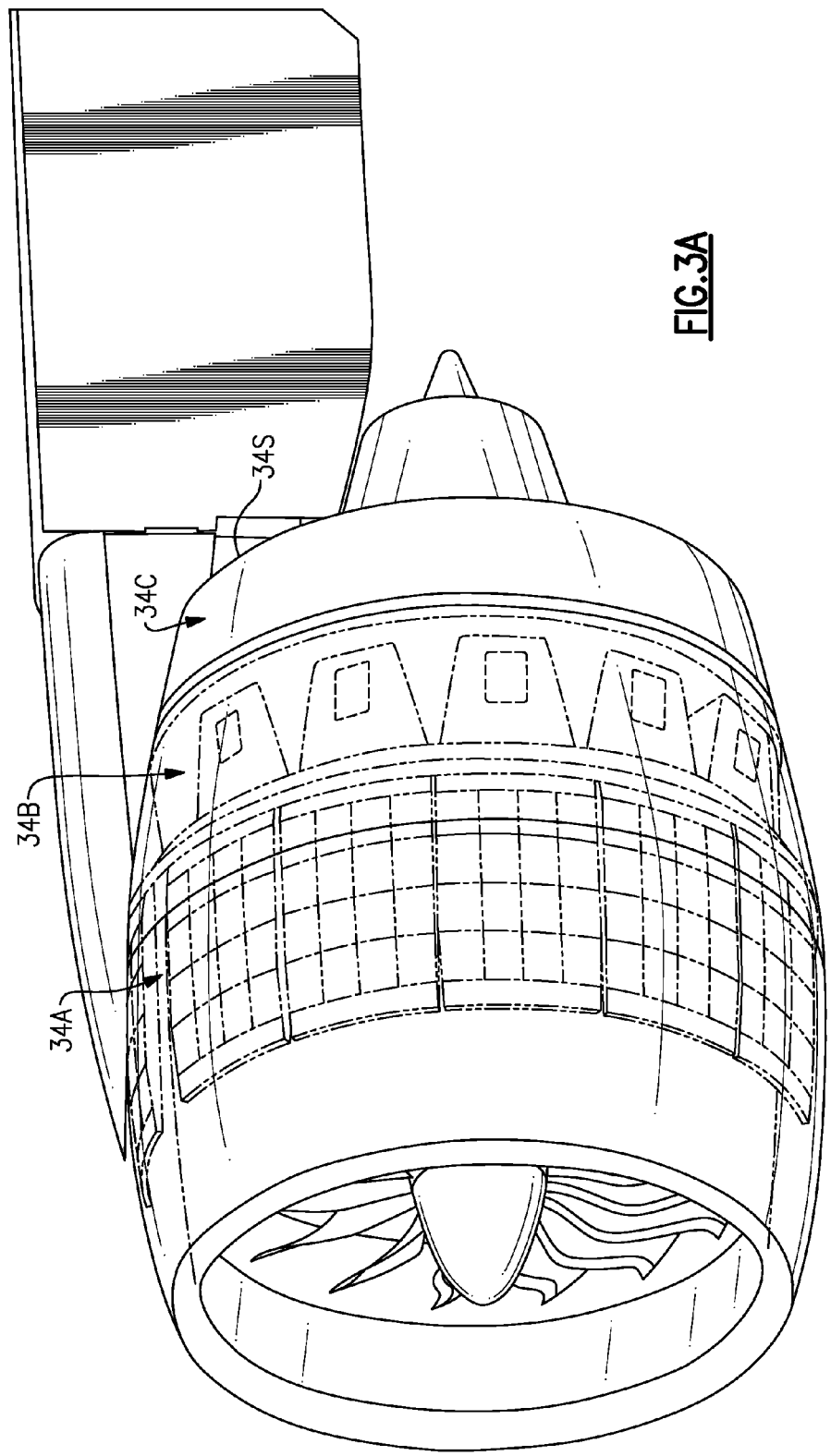
FIG. 3A is a perspective partial phantom view of the engine with the cascade array in a stowed position.
Figure 3B:
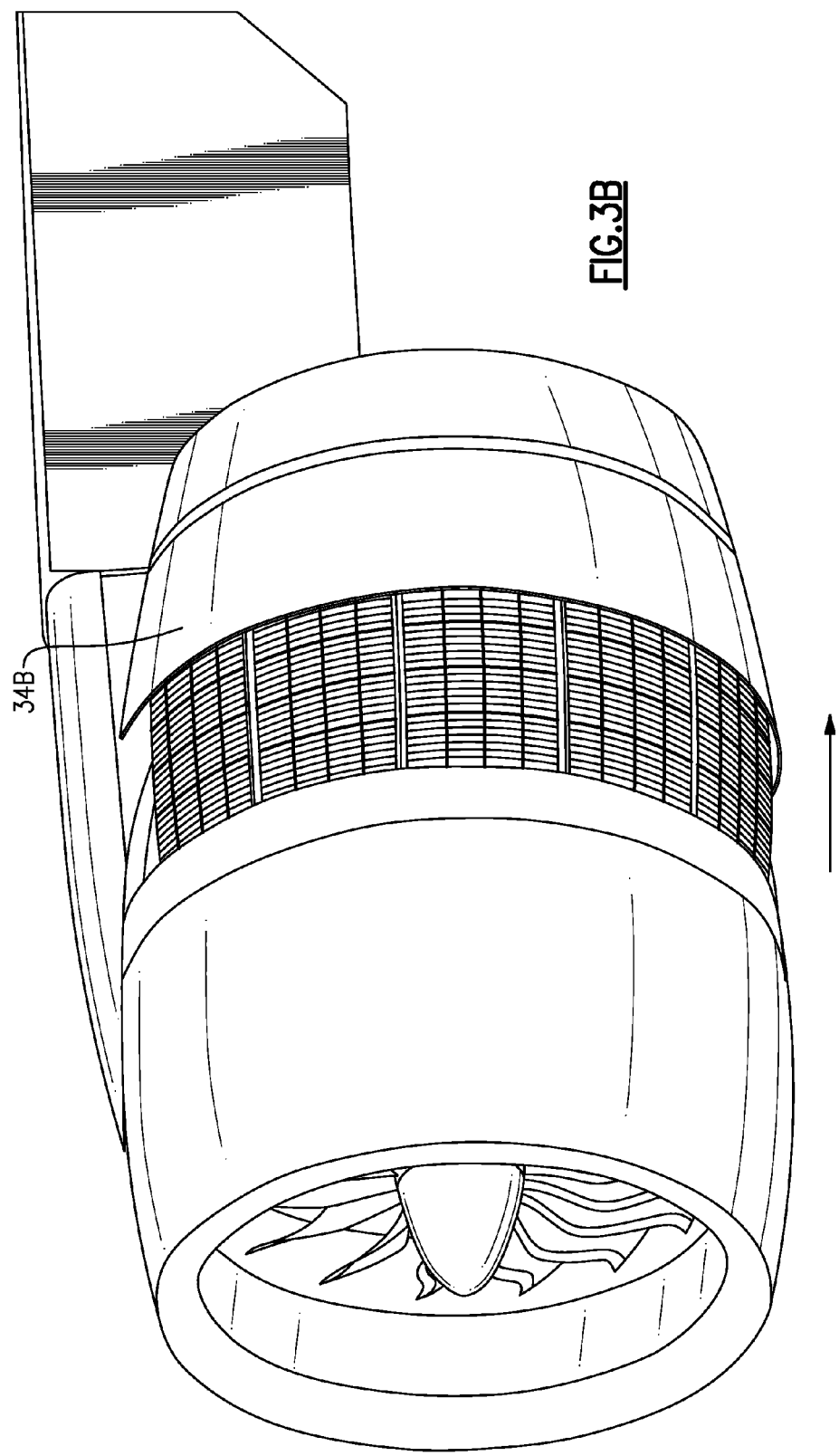
FIG. 3B is a perspective partial phantom view of the engine with the cascade array in a deployed position.

Referring to FIG. 3A, the fan nacelle assembly 34 may be defined by a multiple of nacelle sections 34A, 34B and 34C. The first fan nacelle section 34A is axially fixed. The second fan nacelle section 34B generally defines a thrust reverse cowl assembly and is axially movable relative to the first fan nacelle section 34A along the engine axis A (FIG. 3B). The third fan nacelle section 34C is axially movable relative to the second fan nacelle section 34B and defines the trailing edge 34S of the fan nacelle assembly 34.

A track assembly 50 generally includes a first track 50A which supports the second fan nacelle section 34B for movement relative to the first fan nacelle section 34A and a second track 50B which supports the third fan nacelle section 34C relative to the second fan nacelle section 34A. The second fan nacelle section 34B and the third fan nacelle section 34C slides along the respective track 50A, 50B in response to a respective actuator 52A, 52B (FIG. 4). It should be understood that various track arrangements as well as other support and actuator structures which permit independent movement of the second fan nacelle section 34B and the third fan nacelle section 34C may alternatively or additionally be provided.

An auxiliary port 60 is selectively defined between the second fan nacelle section 34B and the third fan nacelle section 34C to form the VAFN 42. That is, the third fan nacelle section 34C axially slides generally along the engine axis A relative the second fan nacelle section 34B to change the effective area of the fan nozzle exit area 44 such that as the stroke of the third fan nacelle section 34C varies, the leading edge of the third fan nacelle section 34C is either covered by the second fan nacelle section 34B or the leading edge is uncovered to define the auxiliary port 60 (FIGS. 5A and 5B).

The VAFN 42 changes the physical area and geometry of the bypass flow path 40 during particular flight conditions. The bypass flow B is effectively altered by sliding of the third fan nacelle section 34C relative the second fan nacelle section 34B between a closed position (FIG. 5A) and an open position (FIG. 5B). Movement of the third fan nacelle section 34C forward along the track assembly 50 toward the second fan nacelle section 34B closes the auxiliary port 60 between the third fan nacelle section 34C and the second fan nacelle section 34B to essentially provide a decrease in the fan nozzle exit area 44 toward exit area $F_0$. Movement of the third fan nacelle section 34C aftward along the track assembly 50 away from the second fan nacelle section 34B opens the auxiliary port 60 between the third fan nacelle section 34C and the second fan nacelle section 34B to essentially provide an increased fan nozzle exit area 44 toward exit area F1. That is, exit area F1 with auxiliary port 60 is greater than exit area $F_0$.

In operation, the controller C communicates with the respective actuator 52B to translate the third fan nacelle section 34C relative to the second fan nacelle section 34B to effectively vary the area defined by the fan nozzle exit area 44 of the VAFN 42. Various control systems including an engine controller or an aircraft flight control system may also be usable with the present invention. By adjusting the axial position of the entire periphery of the third fan nacelle section 34C in which all sectors are moved simultaneously, engine thrust and fuel economy are maximized during each flight regime by varying the fan nozzle exit area. By separately adjusting the sectors of the third fan nacelle section 34C to provide an asymmetrical fan nozzle exit area 44, engine bypass flow is selectively vectored to provide, for example only, trim balance, thrust controlled maneuvering, enhanced ground operations and short field performance.

Figure 6:
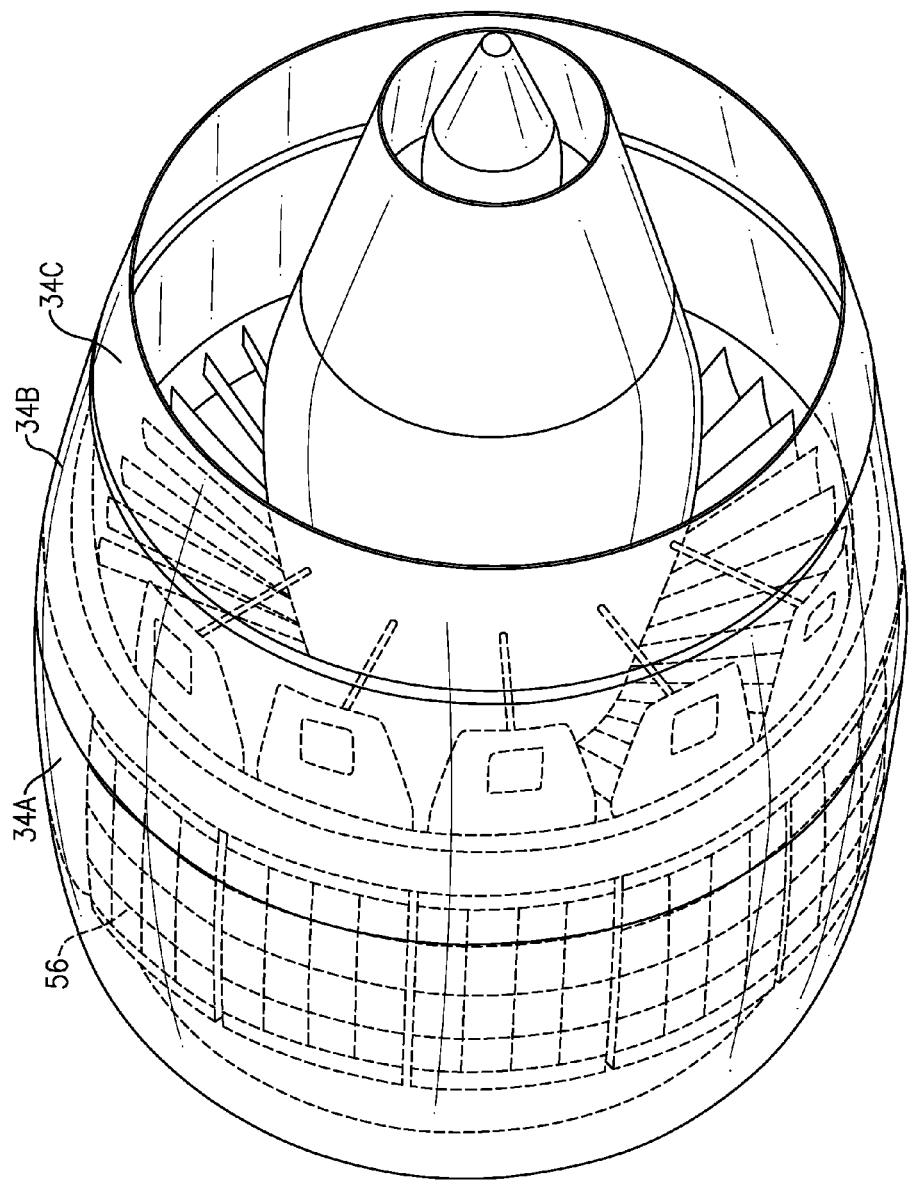
FIG. 6 is a perspective partial phantom view of the engine with the cascade array in a deployed position.
Figure 7A:
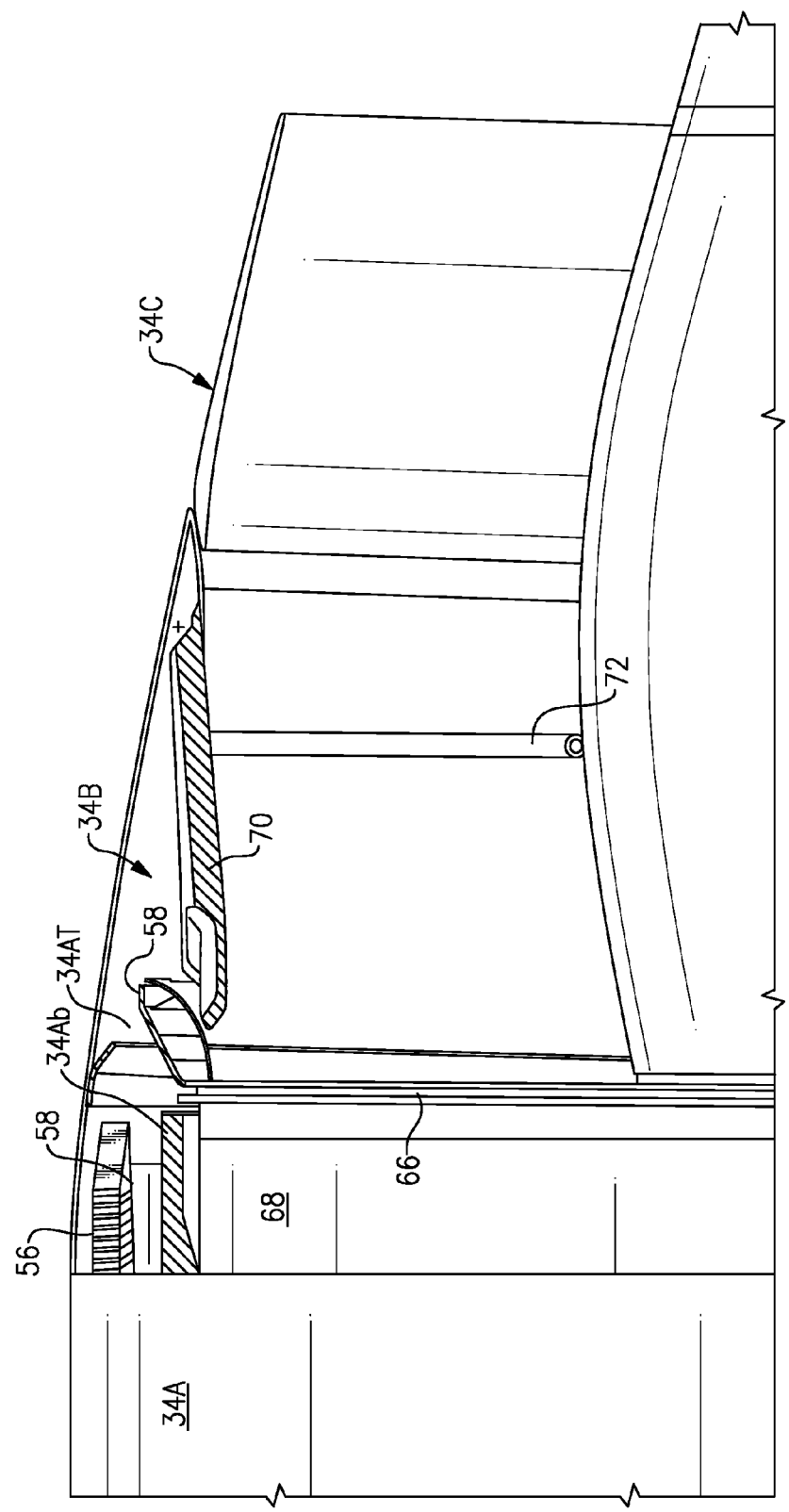
FIG. 7A is a sectional view of the nacelle assembly with the cascade array in a stowed position.
Figure 7B:
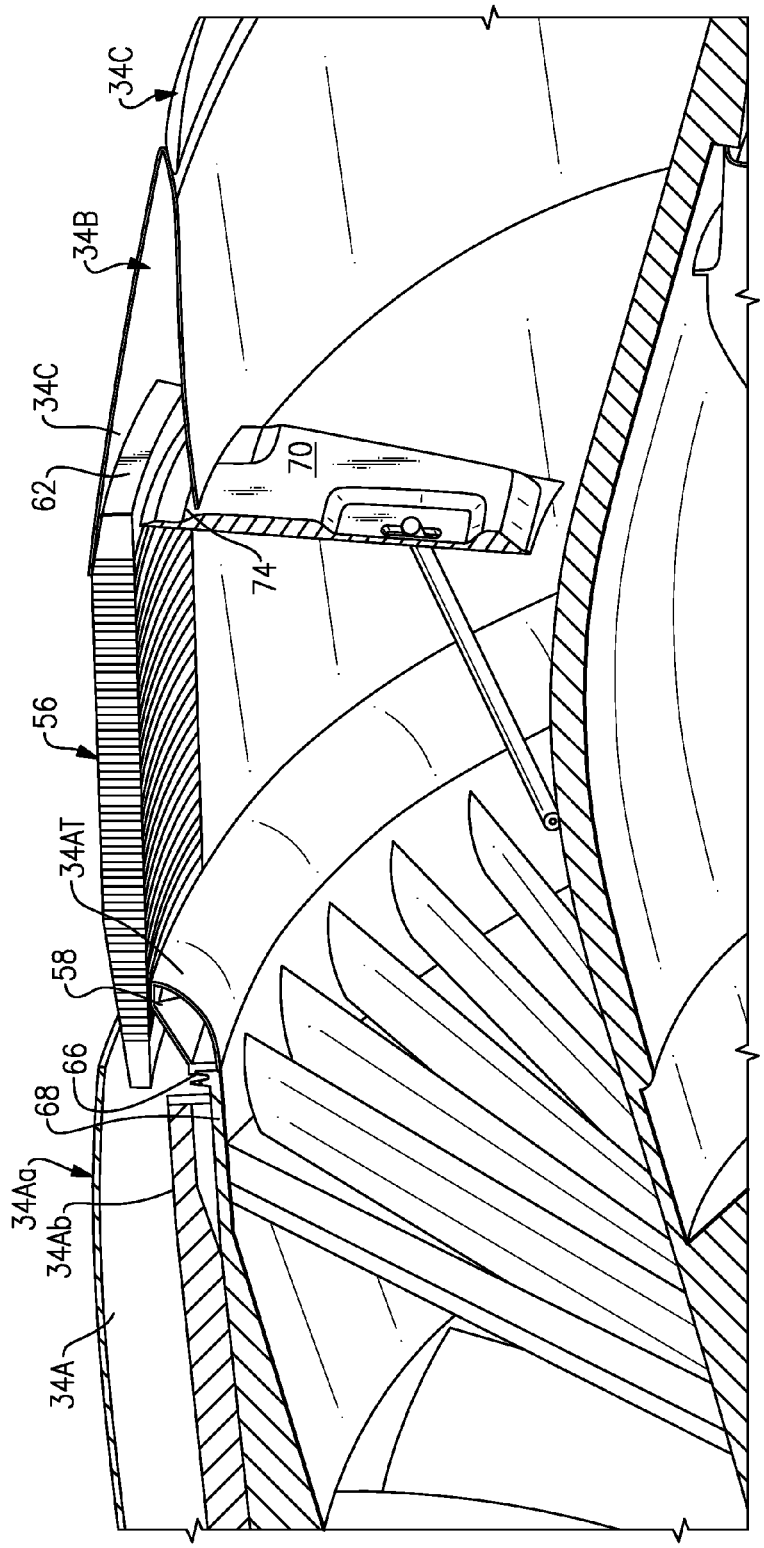
FIG. 7B is a sectional view of the nacelle assembly with the cascade array in a deployed position.

Referring to FIG. 6, a multiple of cascade arrays 56 are mounted for movement relative to that first fan nacelle section 34A between a stored position (FIG. 7A) and a deployed position (FIG. 7B). The cascade arrays 56 may be independent or interconnected circumferentially to one another. The stored position locates the cascade arrays 56 at least partially within the first fan nacelle section 34A between an outer nacelle wall 34Aa and an inner nacelle wall 34Ab. It should be understood that the inner support structure may alternatively or in addition be at least partially defined by an engine case structure 68. That is, various guide and support structure arrangements may be utilized herewith to support movement of the cascade arrays 56. The deployed position locates the cascade arrays 56 between the first fan nacelle section 34A and the second fan nacelle section 34B as the cascade arrays 56 move with the second fan nacelle section 34B.

The trailing edge 34AT defines a bull-nose which generally forms at least a portion of a respective guide 58 (illustrated schematically) along which the cascade arrays 56 move and are supported (best seen in FIGS. 7A and 7B). The guide 58 permits movement of the cascade arrays 56 independent of the second fan nacelle section 34B in response to a respective cascade array actuator 57 (FIG. 4). It should be understood that although illustrated schematically, various guide, support and actuator structures which permit independent movement of the cascade arrays 56 may alternatively or additionally be provided.

The leading edge 34BL of the second fan nacelle section 34B includes a lock mechanism 62 (FIG. 7B) selective engage and disengage the cascade arrays 56. When engaged, the lock mechanism 62 operates to support the aft portion of the cascade arrays 56. The cascade arrays 56 define a stroke length which is greater than that of the second fan nacelle section 34B so that, in one non-limiting embodiment, disengagement of the cascade arrays 56 from the leading edge 34BL of the third fan nacelle section 34C permits the stowed position of the cascade arrays 56 to be forward of an outer V-groove 66 of a rearward end of an engine case structure 68. The cascade arrays 56 thereby utilize the engine case structure 68 as the static structural in the stowed position.

Figure 8:
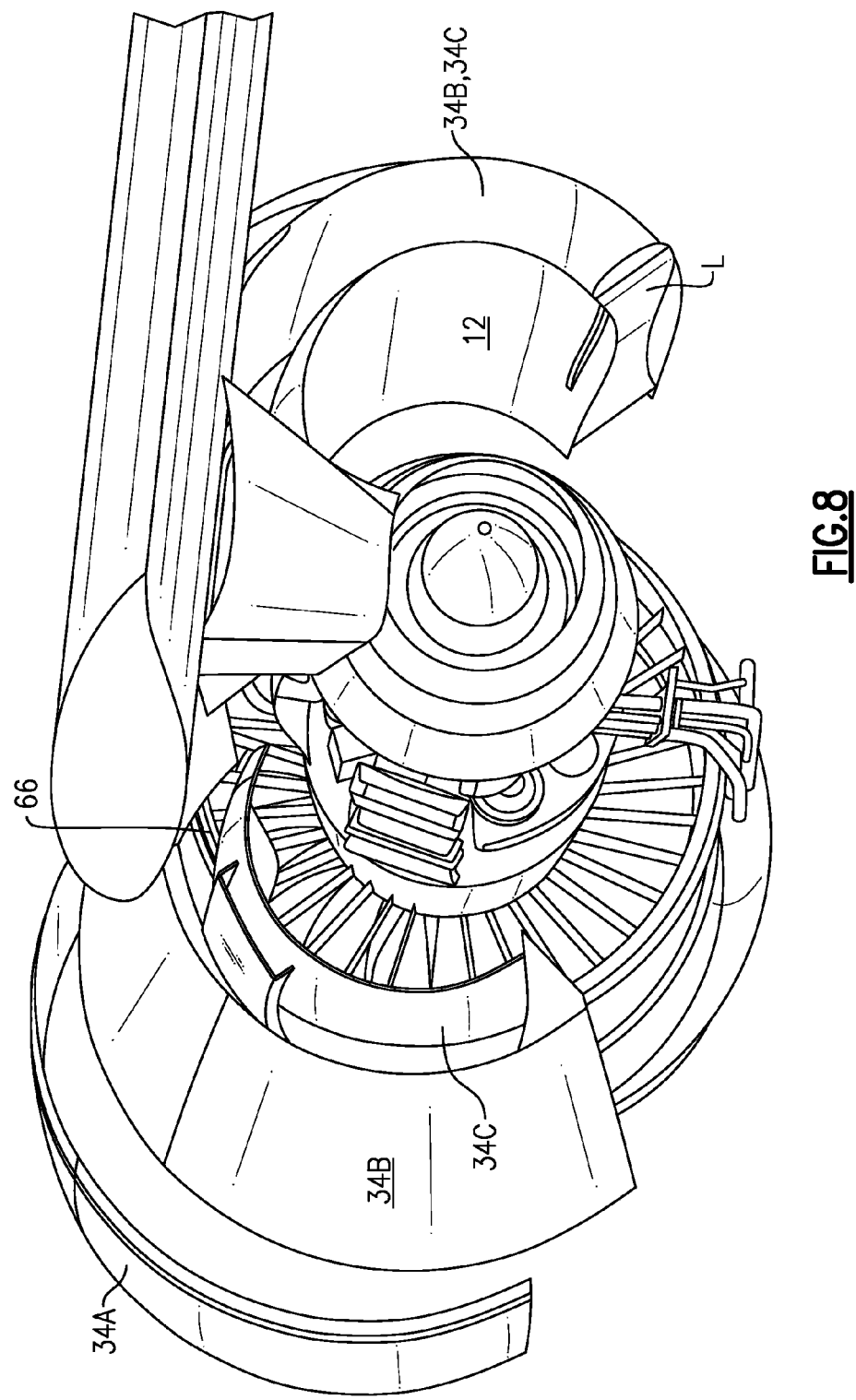
FIG. 8 is a rear perspective view of the nacelle assembly in a maintenance position to illustrate that the cascade array in a stowed position forward of an outer V-Groove permits opening of the nacelle cowl doors.

The outer V-Groove 66 is typically utilized to facilitate alignment and attachment of the second fan nacelle section 34B and the core nacelle 12 to the first fan nacelle section 34A and core nacelle 12. The second fan nacelle section 34B, the core nacelle 12 and the upper and lower bi-fi splitters essentially form a D-duct assembly which may be selectively opened and closed as an assembly around the engine case structure 68 such that the outer V-groove 66 secures the nacelles 12, 34 for loads in the thrust reverse mode (FIG. 8). That is, the D-duct assembly may be opened for maintainability purposes and the cascade arrays 56 are stowed forward of the nacelle circumferential split line defined by the outer V-groove 66 so as not to block this movement. Separation of the cascade arrays 56 from the second fan nacelle section 34B when at the stowed position facilities the circumferential split line. Alternatively, the first fan nacelle section 34A and the second fan nacelle section 34B may be a single unitary structure for further maintenance actions.

The second fan nacelle section 34B support a multiple of blocker doors 70. The second fan nacelle section 34B define a pivot axis for each of the blocker doors 70. A blocker door linkage 72 connects each blocker door 70 to the core nacelle 12 at a pivot 74. In one non-limiting embodiment, the door linkage 72 pass through the respective blocker door 70 such that translation of the second fan nacelle section 34B moves the blocker doors 70 between a stowed position and a deployed position as door linkage 72 pivots about the point 74 on the core nacelle 12. When in the deployed position, the blocker doors 70 divert bypass flow the cascades arrays 56 to vector the bypass flow into reverse thrust.

In thrust reverse operation, the cascade arrays 56 are translated into contact with the leading edge 34BL of the second fan nacelle section 34B in response to the respective cascade actuator 57 across the outer V-Groove 66 (FIG. 4). The cascade arrays 56 are then locked to the leading edge 34BL of the second fan nacelle section 34B through the lock mechanism 62. When engaged, the lock mechanism 62 operates to support the aft portion of the cascade arrays 56 and form an assembly to translate the cascade arrays 56 with the second fan nacelle section 34B. The second fan nacelle section 34B and the cascade arrays 56 locked thereto are then translated as an assembly relative to the first fan nacelle section 34A in response to the respective actuator 52A. Translation of the second fan nacelle section 34B drives the blocker doors 70 from the stowed position to the deployed position.

To translate the cascade arrays 56 to the stowed position, the second fan nacelle section 34B and the cascade arrays 56 locked thereto are translated as an assembly toward the first fan nacelle section 34A in response to the respective actuator 52A. The lock mechanism 62 is then disengaged and the cascade arrays 56 are fully retracted across the outer V-Groove 66 by the cascade actuator 57.

The length of the cascade arrays 56 are separate from the fan duct length, which reduces the overall nacelle length. The cascade arrays 56 also fit within the nacelle aerodynamic lines to provide a shorter and smaller system than that of conventional nacelle thrust reversers. Shorter length and smaller diameter nacelles improve fuel burn performance of aircraft engines through reduced drag, reduced duct pressure loss and reduced nacelle weight.

Alternatively, the second fan nacelle section 34B and the cascade arrays 56 always remain locked together during operation and are manually disengaged for maintenance. Such and arrangement may avoid the necessity of the cascade actuator as the cascade arrays 56 are moves in conjunction with the second fan nacelle section 34B and the actuator 52A therefor.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A nacelle assembly for a high-bypass gas turbine engine comprising:
   a core nacelle defined about an engine centerline axis;
   a fan nacelle mounted at least partially around said core nacelle to define a fan bypass flow path, said fan nacelle includes a first fan nacelle section and a second fan nacelle section, said second fan nacelle section movable relative to said first fan nacelle section; and
   a cascade array including at least one section mechanically engaged with a cascade array actuator configured to translate said cascade array relative to said first fan nacelle section between a deployed position and a stored position, said second fan nacelle section being moveable in response to translation of said cascade array, said stored position locating said cascade array at least partially within said first fan nacelle section, wherein the interior of said second fan nacelle section is free of any section of said cascade array and said second fan nacelle section is spaced axially from said cascade array to define a clearance gap between said cascade array and said second fan nacelle section when said cascade array is located in said stored position.

2. The assembly as recited in claim 1, wherein said stored position locates said cascade array forward of an outer V-Groove defined by an engine fan case radially inward from said cascade array.

3. The assembly as recited in claim 2, wherein a trailing edge of said first fan nacelle section defines a bull-nose having an arcuate configuration and extending circumferentially about said engine fan case and directly supporting said cascade array.

4. The assembly as recited in claim 1, further comprising a multiple of blocker doors mounted to said second fan nacelle section for pivotal movement relative to said second fan nacelle section.

5. The assembly as recited in claim 4, further comprising a multiple of blocker door linkages, each of said multiple of blocker door linkages mounted to one of said multiple of blocker doors and said core nacelle.

6. The assembly as recited in claim 5, wherein each of said multiple of blocker door linkages extend through each of said respective multiple of blocker doors.

7. The assembly as recited in claim 1, further comprising a variable area fan nozzle in communication with said fan bypass flow path, said variable area fan nozzle having a VAFN cowl axially movable relative to said second fan nacelle section to vary a fan nozzle exit area and adjust fan bypass airflow.

8. The assembly as recited in claim 1, further comprising a lock mechanism including a first lock element connected to said cascade array and a second lock element connected to said second fan nacelle section, said lock elements moveable between a locked position and an unlocked position, said lock mechanism being configured to minimize relative movement between said cascade array and said second fan nacelle section when in said locked position and to permit relative movement between said cascade array and said second fan nacelle section when in said unlocked position.

9. The assembly as recited in claim 1, wherein said stored position locates said cascade array between an outer wall and an inner wall of said first fan nacelle section.

10. The assembly as recited in claim 1, wherein said cascade array actuator is attached to said cascade array.

11. The assembly as recited in claim 1, wherein said core nacelle and said fan nacelle each includes at least two sectors defined between a pylon and a lower Bi-Fi splitter, each of said sectors arranged about said engine centerline axis.

12. The assembly as recited in claim 11, wherein each sector of said core nacelle and second fan nacelle is pivotable radially outward about said pylon between an operating position and a maintenance position, whereby said interior of said second fan nacelle section is free of any section of said cascade array when said second fan nacelle is in said maintenance position.

13. The assembly as recited in claim 2, wherein said engage fan case and said first fan nacelle section are attached to each other at said outer V-Groove.

14. The assembly as recited in claim 3, wherein said bullnose is attached to said outer V-Groove of said engine fan case.

15. The assembly as recited in claim 4, wherein each of said blocker doors attaches to the leading edge of the second fan nacelle section at a point between each of the ends of the blocker doors.

16. The assembly as recited in claim 7, wherein said VAFN cowl having at least two sectors defined between a pylon and a lower Bi-Fi splitter, each of said sectors axially movable relative to said second fan nacelle section to provide an asymmetrical fan nozzle exit area.

17. A high-bypass gas turbine engine comprising:
a core engine defined about an axis;
a gear system driven by said core engine;
a turbofan driven by said gear system about said axis;
a core nacelle defined at least partially about said core engine;
a fan nacelle mounted at least partially around said core nacelle to define a fan bypass flow path, said fan nacelle includes a first fan nacelle section and a second fan nacelle section, said second fan nacelle section movable relative to said first fan nacelle section;
a cascade array including at least one section mechanically engaged with a cascade array actuator configured to translate said cascade array relative to said first fan nacelle section between a deployed position and a stored position, said second fan nacelle section being moveable in response to translation of said cascade array, said stored position locating said cascade array completely within said first fan nacelle section, wherein the interior of said second fan nacelle section is free of any section of said cascade array and said second fan nacelle section is spaced axially from said cascade array to define a clearance gap between said cascade array and said second fan nacelle section when said cascade array is located in the stored position.

18. The engine as recited in claim 17, further comprising a variable area fan nozzle in communication with said fan bypass flow path, said variable area fan nozzle having a VAFN cowl axially movable relative to said second fan nacelle section to vary a fan nozzle exit area and adjust fan bypass airflow.

19. The engine as recited in claim 17, wherein said stored position locates said cascade array between an outer wall and an inner wall of said first fan nacelle section.

\* \* \* \* \*